Sept. 11, 1923.
F. S. LIVINGSTON
VALVE
Filed June 24, 1921
1,467,486
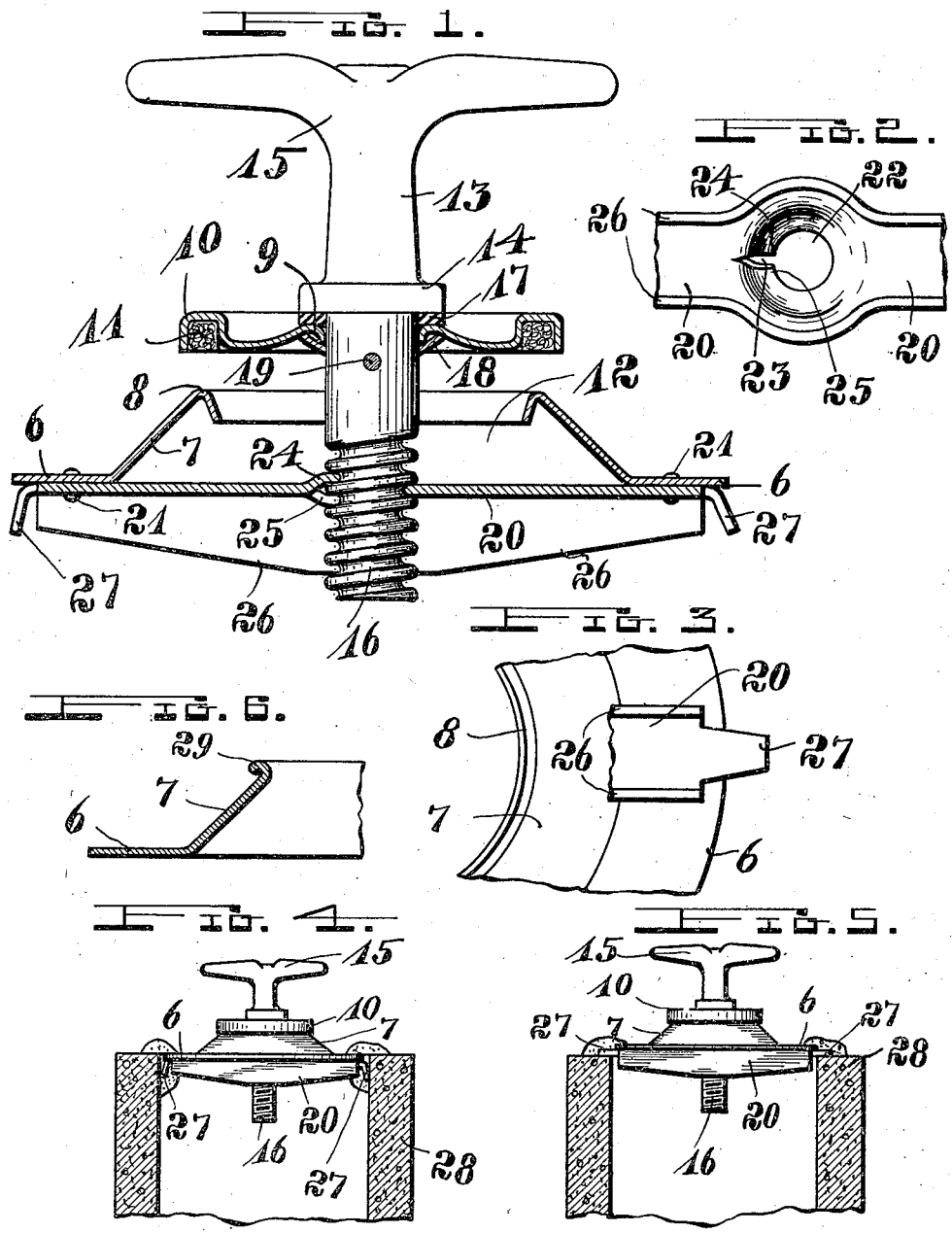
INVENTOR:
FRANK S. LIVINGSTON,
BY: Otto H. Krueger,
his Atty.

Patented Sept. 11, 1923.

1,467,486

UNITED STATES PATENT OFFICE.

FRANK S. LIVINGSTON, OF LOS ANGELES, CALIFORNIA, ASSIGNOR TO SNOW MANUFACTURING COMPANY, OF LOS ANGELES, CALIFORNIA.

VALVE.

Application filed June 24, 1921. Serial No. 480,203.

*To all whom it may concern:*

Be it known that I, FRANK S. LIVINGSTON, a citizen of the United States, residing at Los Angeles, in the county of Los Angeles and State of California, have invented a new and useful Valve, of which the following is a specification.

This invention relates to devices for controlling the flow of fluids.

One of the objects of this invention is to provide a valve having the majority of its parts made of sheet-metal.

Another object is to provide a screw engagement of which the female part is made of sheet metal.

Another object is to provide a device of this type with means to engage in openings of ducts preparatory to cementing the joint between the device and the duct.

Other objects will appear from the following description and appended claims as well as from the accompanying drawing, in which—

Fig. 1 is a vertical midsectional view of the complete device.

Fig. 2 is a fragmentary detail view of the female part of the screw-engagement of the device, as seen from the underside.

Fig. 3 is a fragmentary detail view from the underside of the engaging means for holding the device for securing it within the openings of ducts.

Fig. 4 is a side elevation of the device disposed within the upper end of a cement stand-pipe.

Fig. 5 is a side elevation of the device disposed on the top-end of a cement standpipe.

Fig. 6 is a slightly modified form of the seat of the body-member.

The main body of the device is preferably made of sheet metal, having a main supporting flange 6, the housing or body portion 7, and the rolled-in inner or upper edge of flange 8. The body portion 7 is preferably made of conical form as illustrated, to simplify die-work and stamping. The rolled-in upper or centermost edge is designed to form a smooth valve seat.

The cover-plate is also designed so that it can easily and advantageously be manufactured in connection with dies and presses, the centermost edge 9 being rolled in, forming a supporting bearing portion, and the outermost edge 10 being shaped to receive a packing ring 11. The cover-plate is of a size to control the passage 12 through the main body member, the outer edge 10 with the packing material 11 being in a position to engage with the seat 8 of the body member.

A stem 13 is provided to turnably engage with the cover-plate, having a shouldered portion 14 to seat on the top surface of the cover-plate, a handle portion 15 for operating the handle or stem, and a screw portion 16 to hold the cover-plate in suitable relation to the main body. A washer 17 is preferably placed between the shoulder portion 14 and the top surface of the cover-plate to take up the wear between the two parts and at the same time serve as a packing material in this joint. Another washer 18 is placed on the underside of the cover-plate supported by the pin 19, so that the cover-plate is turnably mounted between the two washers on the stem. The screw portion 16 of the stem is preferably cast on, but may also be cut or otherwise formed by any well known method of providing such threads.

A cross bar 20 is provided on the underside of the main body member, rivets being indicated at 21, but the bar 20 may also be secured to the main body member by spot welding or other similar means. A plan view, seen from the underside of the bar, is illustrated in detail in Fig. 2, being the centermost portion of the bar. The bar is perforated and formed in dies so that the edge of the material around the perforation or hole 22 is brought to curve in form of a spiral, the edge being cut as indicated at 23, one termination of the spiral lip being depressed as indicated at 24, and the other termination of the spiral lip being raised as indicated at 25. The screw portion 16 of the stem engages with this spiral edge of the cross bar, as illustrated in Fig. 1.

Male and female parts of the screw engagement between the cover-plate and the body member, designed as described above, require no threading or other finishing.

The cross bar 20 is preferably stamped in channelled form of U-shaped cross section, having the flanges 26 projecting downwardly, the base facing the underside of the valve body for supporting the body as described above. The ends of the cross bar are formed to engage in the opening, to be controlled by the valve, preparatory to securely placing the valve in such opening, such engaging means of the cross bar being illustrated in detail in Fig. 3. The ends 27, being of sheet metal of suitable size, can easily be bent according to the illustration in Fig. 1 to slip into the upper end of a concrete stand pipe 28, as illustrated in Fig. 4, for holding the valve in position while being secured within the stand pipe by cementing or in other similar ways. The ends 27 may, however, be left straight to be placed on the top end of the stand pipe as illustrated in Fig. 5. The securing of valves of this type is accomplished in many different manners, and it does not matter how the device is sealed or secured within the opening which it is to control as long as the securing can be accomplished with the means provided on the device.

In the slightly modified form, illustrated in Fig. 6, the edge 29 is rolled in towards the outside, instead of inwardly as illustrated in Fig. 1. From this it will be clear that it is immaterial what shape the seat portion of the valve body receives as long as the whole can be made by simple actions and operations in dies. The rolled-in edge need only to receive a slight blow in a die to give the edge the necessary and required smoothness for a valve-seat, a very short crimping either in the direction illustrated in Fig. 1 or in the direction and manner illustrated in Fig. 6 being sufficient, as will easily be understood.

Having thus described my invention, I claim:

1. In a valve, a body member stamped of sheet metal having a flange projecting outwardly at one end and having a rolled-in edge projecting inwardly at the other end to form a valve seat, the portion between the two flanges being of conical form; a cover-plate stamped of sheet metal having means to engage with the seat of the body member; a female member stamped of sheet metal in form of a perforation through the sheet metal, the edge in the perforation being cut in and formed along a spiral curve concentric to the perforation; and a screw member to engage with the female member for holding the cover-plate in controlling relation to the body member.

2. In a valve, a body member; a cover-plate; a female member formed by a perforation in a member of sheet metal, the edge of the material surrounding the perforation being cut in and formed along a spiral curve concentric to the perforation; a screw member to engage with the female member for holding the cover-plate in suitable relation to the body member; and engaging means on the body member projecting beyond the body proper to rest on the edge of an opening in a duct which this valve is to control and adapted to be bent to engage within the opening below the surface of the material in the opening of the duct.

3. In a valve, in combination with a body member and a cover plate for controlling an opening in a duct, an engaging member on the said body member projecting beyond the contours of the body member to rest and support the body member on the edges of the said opening in the duct and adapted to be bent to engage within the opening below the surface of the edges in the opening of the duct preparatory to sealing the body in the duct.

4. In a valve, in combination with a body member, a cover plate, and a threaded stem turnably engaged with the cover plate for holding the cover plate in suitable relation to the body member; a cross member applied to the body member projecting beyond the contours of the body member for resting and supporting the body member on the edges of an opening in a duct which this device is to control and adapted to be bent to engage within the opening of the duct preparatory to sealing the said body member in the duct, the center of the cross member being provided with an aperture having a cut and having the edges formed in a spiral curve concentric to the aperture for engaging with the threads of the said stem.

In testimony that I claim the foregoing as my invention I have signed my name in the presence of two subscribing witnesses.

FRANK S. LIVINGSTON.

Witnesses:
O. H. KRUEGER,
JESSIE A. MANOCK.